US006356866B1

(12) United States Patent
Pratley et al.

(10) Patent No.: US 6,356,866 B1
(45) Date of Patent: Mar. 12, 2002

(54) METHOD FOR CONVERTING A PHONETIC CHARACTER STRING INTO THE TEXT OF AN ASIAN LANGUAGE

(75) Inventors: Christopher H. Pratley; Erik J. Rucker, both of Seattle; David C. Oliver, Bellevue; Kentaro Urata, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/167,914

(22) Filed: Oct. 7, 1998

(51) Int. Cl.[7] .............................................. G06F 17/27

(52) U.S. Cl. ........................................ 704/9; 707/535

(58) Field of Search ................... 704/1, 8–10; 707/530, 707/535, 532, 540; 345/150, 171

(56) References Cited

U.S. PATENT DOCUMENTS

| 5,321,801 | A |   | 6/1994  | Ando ........................ 707/535 |
| 5,535,119 | A |   | 7/1996  | Ito et al. .................... 707/535 |
| 5,634,066 | A |   | 5/1997  | Takehara et al. ........... 707/535 |
| 5,634,134 | A |   | 5/1997  | Kumai et al. ............... 707/536 |
| 5,999,950 | A | * | 12/1999 | Krueger et al. ............ 707/535 |
| 6,003,050 | A | * | 12/1999 | Silver et al. ................ 707/536 |
| 6,035,269 | A | * | 3/2000  | Kim ............................. 704/9 |

FOREIGN PATENT DOCUMENTS

| DE | 3248631 A1 | 7/1984 |
| EP | 0 472 444 A2 | 2/1992 |

OTHER PUBLICATIONS

Microsoft® IME97 for Windows® 95 Upgrade, pp. 38–39, ©1996 Microsoft Corp.
"How to Have Accelerator Keys Support Japanese and US Keyboards," from the Microsoft Technical Support Website, http://www.microsoft.com/kb/articles/q129/0/80.htm, Article ID #Q129080, last reviewed Apr. 19, 1995, pp. 1–2.
"Input Method Editor (IME) in Japanese Windows 3.1," from the Microsoft Technical Support Website, http://www.microsoft.com/kb/articles/q123/3/92.htm, Article ID #Q123392, last reviewed Jul. 23, 1997, pp. 1–2.
"Appendix E1: Far East Enabling: Input Method Editor (IME)," source unknown, 4 pages.
Kano, N., "Common IME System on Far East Windows 95," article adapted from *Developing International Software for Windows 95 and Windows NT* by Nadine Kano, Sep. 12, 1995, pp. 1–5.
Tamaru, K., "How to use Japanese IME (Input Method Editor)," Aug. 12, 1997, pp. 1–2.

* cited by examiner

*Primary Examiner*—Patrick N. Edouard
(74) *Attorney, Agent, or Firm*—Merchant & Gould (57) ABSTRACT

Converting an incoming phonetically-coded string representing an East Asian language into its proper text characters. Conversion is triggered when dynamic IME analysis of the string indicates a threshold probability of correct conversion. Conversion of unconverted phonetic text is also triggered when the user relocates the insertion point. The user may select portions of text affected by conversion error and access a corresponding editable phonetic string and a prioritized list of alternate conversions for that string. The corresponding phonetic string is generated from the selected text if the original input string is unavailable.

30 Claims, 5 Drawing Sheets

UNPROMPTED CONVERSION

FIG.3

FIG.4 ERROR CORRECTION

CONVERSION ERROR CORRECTION

FIG.5

METHOD FOR CONVERTING A PHONETIC CHARACTER STRING INTO THE TEXT OF AN ASIAN LANGUAGE

FIELD OF THE INVENTION

This invention relates in general to inputting text of an Asian language for operation by a program module, such as a word processing program, and in particular to using an Input Method Editor (IME) to convert an input string representing text of the Asian language into the proper characters for that language.

BACKGROUND OF THE INVENTION

Providing text to a program module, such as a word processing program, is straightforward when a written language has one small character set. For example, the English language system uses twenty-six alphabet characters. Typical keyboards for conventional desktop computers have approximately 101 keys, so each English language alphabet character is assigned to a different key. To enter a word into an electronic document, an author depresses the keys that correspond to the letters of the words. The keystrokes are sent from the keyboard to the word processing program running on the computer.

In contrast to the English language system, some language systems, including East Asian languages, such as Japanese, Chinese, and Korean, have significantly more characters than there are keys on a keyboard. For example, the Japanese language system uses thousands of pictographic, Chinese-derived Kanji characters. The large number of Kanji characters precludes assigning each Kanji character to a different key. The process is further complicated because Japanese text also incorporates three other character sets. The most common is Hiragana, a character set of 46 phonetic syllable characters. Katakana (46 phonetic syllable characters) and Romaji (the 26 character Latin alphabet) are used for words whose origins are neither Japanese nor Chinese. Thus, Japanese computer users require front-end input processing to select the desired character from the appropriate character set for entry into an electronic document. Similarly, other East Asian language computer users, such as a Chinese user, also require front-end input processing to support the entry of characters into an electronic document.

Focusing on electronic document processing issues for Japanese users, typists can work modally, switching from character set to character set and specifying characters by a series of one or more keystrokes. However, the sheer size of the Kanji character set makes this approach impractical for typists to master. Instead, typists use a front-end processor, commonly known as an Input Method Editor (IME), to produce Japanese text from phonetic input. Typically, these front-end input processors convert Romaji alphabet strings into their sound-alike kana (Hiragana and/or Katakana) characters, or accept text directly entered in a kana character set, and then process the kana into Japanese text in a separate step.

Japanese IME conversion is error-prone for two main reasons: homophones and ambiguous word breaks. First, Japanese, like English, contains words that sound alike and might even be appropriate in the same context; for an English example, "I want these two" and "I want these too." Second, Japanese typists typically do not delimit words; the IME must decide how to group the kana characters into words. Because of this possibility for conversion error, the IME must allow the user to choose among alternate conversions after she has proofread the IME's conversion.

From a user's perspective, the traditional method for Japanese IME operation involves three basic steps. First, the user types a phonetic phrase, in kana or Romaji. This phrase is typically very short because the typist knows that shorter phrases are more successfully converted. Second, the user stops typing and hits the "convert" key. Third, the user proofreads the conversion.

If the conversion is inaccurate, the user can depress the convert key again. The IME reconverts to the next most likely character set. If this is still not the desired character set, the user hits the convert key a third time. On the third conversion attempt, the IME presents a prioritized list of possible conversions. If the desired conversion is absent from the list, the user might manually select desired Japanese pictographs using another conversion mechanism. Once satisfied, the user approves the conversion and returns to typing. The converted text is then given "determined" status, i.e., the input string is discarded and the converted text is maintained.

This IME model has two main drawbacks: reduced typing speed and increased learning time. Speed is compromised because the typist must use extra keystrokes to convert text. Additionally, the input rhythm for inputting characters broken because the typist must proofread at each conversion, or lose the opportunity to choose among alternate conversions. Learning time is increased because prior IME systems typically require user training and experience to gain optimum performance from the IME.

The "IME '97" front-end input processor marketed by Microsoft Corporation of Redmond, Washington offers an improved solution. With this option, text is automatically converted when the IME detects a viable phrase, and automatically determined if the user continues typing for several lines without converting. However, alternate conversions are unavailable for determined text as in the traditional IME model described above.

Accordingly, there is a need in the art for a method for an IME that operates as an automated background process and avoids the editing difficulties of "determined" text. There is a further need for a background input processor for converting kana to Japanese text and for generating alternate conversions for converted text positions to support efficient error conversion.

SUMMARY OF THE INVENTION

Generally described, the present invention meets the needs of Asian computer users for both background text processing and convenient and flexible error corrections. An Input Method Editor (IME) can convert an input string representing text of an East Asian language, such as Japanese, Chinese or Korean, into the proper characters for that language. The present invention is equally applicable to other large-character-set languages comprising of nonphonetic characters.

The present invention provides a computer-implemented method for converting phonetically-coded input into the proper characters of a selected language for use by a program module, such as a word processor, running on a computer system. The input string is converted into a language text string automatically, i.e., without explicit conversion events prompted by the user.

The present invention also can support a reconversion operation to address inaccurate text conversions. For example, when two or more distinct phrases contain the same phonetic syllables, the automatic conversion may produce an incorrect section of text. The user may correct these conversion mistakes by accessing alternate conversions of any section of text at any time. When text is selected for reconversion, a corresponding all-phonetic string is identified. This phonetic string is used to generate the list of alternate conversions for the selected text. To produce a corrected conversion, the user may select among the alternate conversions provided, or perform a manual conversion by explicitly selecting characters.

For an IME system compatible with the Japanese language, phonetically-coded Japanese character strings are typically entered in Romaji (the same character set used by English) and immediately converted to kana, usually Hiragana. For example, a user typing the letter "k" will see "k" displayed on the screen of a display device. When she follows "k" with "a", forming the syllable "ka", the corresponding kana character replaces the "k" in the user's display device. The user sees a constant shift of Romaji to kana characters on the display device. The phonetic input in its intermediate, pre-conversion state will be referred to as a phonetically-coded string, such as a kana string or kana characters. The invention, however, is also applicable to non-Romaji phonetic input methods. For example, voice recognition software and kana keyboards could both produce comparable phonetically-coded strings.

The present invention can initiate the conversion of a kana string, called the "active portion," as each kana character is received. An "active portion" comprises phonetically-coded characters, such as kana characters, corresponding to the text immediately behind the insertion point, where the insertion point is typically represented by the cursor of a word processing program. An analysis is conducted to determine how much of the active portion may be confidently converted to Japanese text, and what amount should remain in kana form. A conversion is sufficiently confident when it exceeds a predetermined threshold for predicted accuracy.

The automatic conversion of the active portion may be more particularly described as the identification of the longest substring within the active portion that is eligible for conversion. A substring is eligible for conversion if it both includes the character positioned farthest from the insertion point, and it exceeds a threshold probability of accurate conversion. The threshold typically decreases as the length of the substring decreases. The automatic conversion can be assisted by analysis of the context of the active portion, i.e., the converted text on one or both sides of the active portion.

From the user's perspective, kana shifts to Japanese text at a point behind the cursor in response to a conversion operation. Also, converted text inside the active portion may shift to a more probable conversion. In contrast, text outside the active portion does not change, unless selected for reconversion.

Additionally, the active portion can be fully converted whenever the user moves the insertion point, typically shown by a cursor. The entire active portion kana string is converted to the most probable character set for that string in response to a change in the location of the insertion point. The conversion can be assisted by analysis of the context of the active portion, i.e., the converted text on one or both sides of the active portion.

A conversion error can be corrected in response to selecting the converted character or characters corresponding to the error. In response to a reconvert command, a kana string corresponding to the selected text is identified. This kana string is used to generate alternate conversions for the selected text. These alternate conversions can be presented to the user in an alternate conversion list.

The user has several options for completing the conversion correction. First, a selection made from the alternate conversion list can replace the original conversion. Second, the kana string used to generate the alternate conversions can be edited to produce a new alternate conversion list. Third, individual characters can be specified to produce a "manual" reconversion. For example, individual characters can be specified by selecting characters from a dictionary program module or by drawing selected characters with an input device, such as a mouse in a writing recognition program.

In both maintaining the active portion, and in creating an alternate conversion list, an all-kana string is identified. If some or all of the original input kana characters are not available on a memory storage device coupled to the computer system, those kana characters can be created through a reverse-conversion process. For example, an IME can locate all or part of the phonetic string on a memory storage device, generate any missing phonetic characters using a reverse-conversion operation, and produce a complete phonetic string for the active portion.

These and other aspects, features and advantages of the present invention may be more clearly understood and appreciated from a review of the following detailed description of the disclosed embodiments and by reference to the appended drawings and claims.

DETAILED DESCRIPTION OF EXEMPLARY EMBODIMENTS

The present invention is directed to an Input Method Editor (IME) for producing text of Asian languages, and typically operates in the background in connection with computing tasks. Although a Japanese language implementation represents an exemplary embodiment for the detailed description, the invention can be extended to operation with other languages, including Chinese and Korean. For example, the invention can be used with large-character set languages comprising nonphonetic characters.

Briefly described, phonetic input is converted into text without user execution of a conversion-determination sequence. Further, the user may select any portion of converted text and issue a reconvert command to generate an alternate conversions list presenting alternative conversions of the selected converted text. The user may then select from the list of prioritized alternate conversions to replace the converted text portion. Advantageously, the invention provides an IME that allows the user to maintain a natural input rhythm and to proofread the accuracy of text conversion at her convenience.

Exemplary Operating Environment

Figure 1:
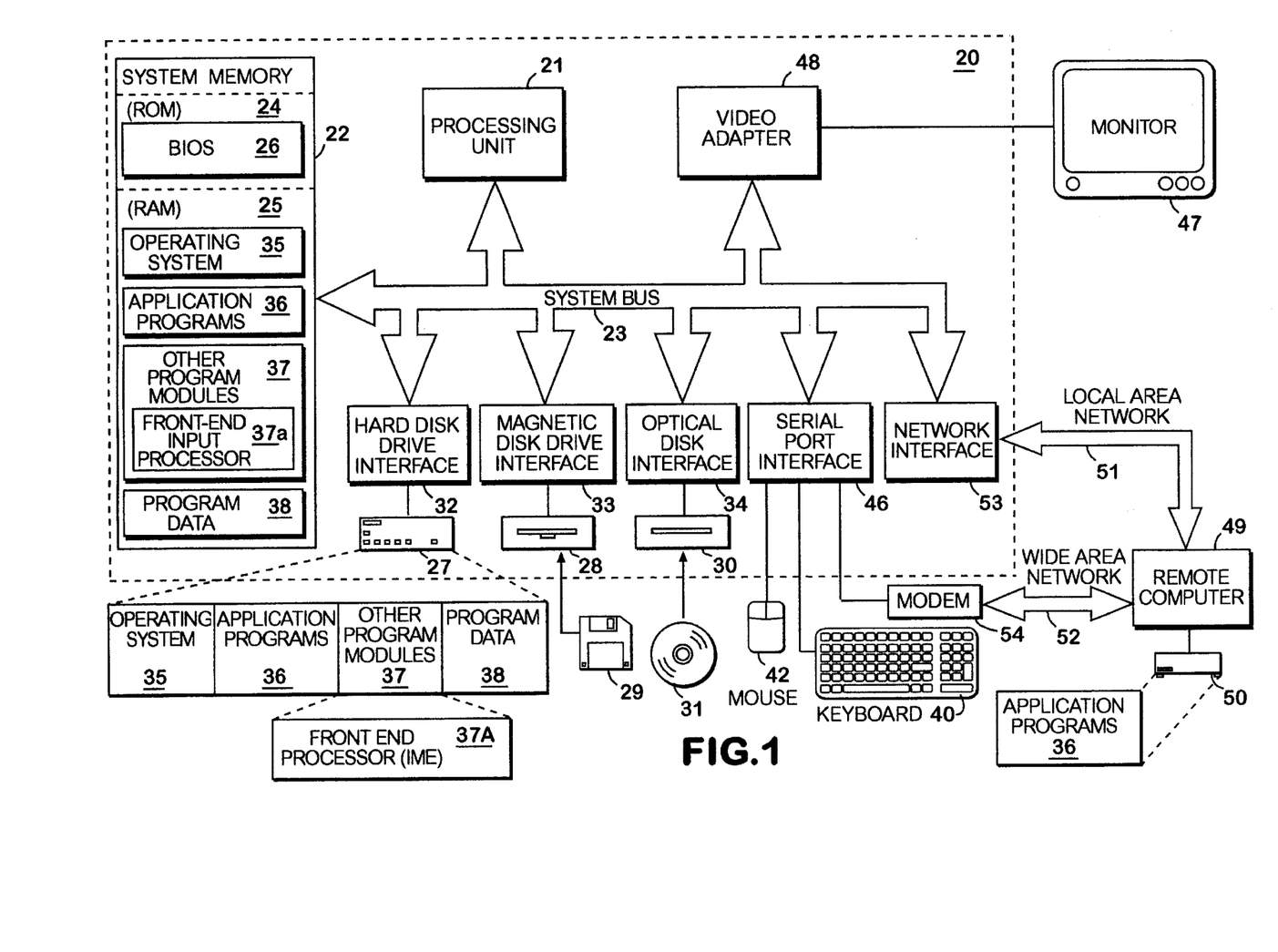
FIG. 1 is a block diagram of a personal computer illustrating the operating environment for an embodiment of the present invention.

FIG. 1 and the following discussion are intended to provide a brief, general description of a suitable computing environment in which the present invention may be implemented. While the invention will be described in the general context of a front-end input processor used in connection with an application program and an operating system running on a personal computer, those skilled in the art will recognize that the invention also may be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, including a front-end input processor 37a, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Japanese Language Keyboard

An embodiment of the present invention may be used with the keyboard 40, such as a Japanese language keyboard, to enter text strings for processing by an application program 36, such as a word processing program, and the front-end input processor 37a, typically implemented as an IME. The keys of a typical Japanese keyboard contain two character designations, a Latin character (a, b, c, etc.) designation and a kana character designation. The active character designation is controlled by the keyboard input method. Two keyboard input methods, the Romaji method and the kana method, are typically supported in this character input environment. In the Romaji method, the Latin character is active, wherein the kana character is active in the kana method. The keyboard input method is user-selectable, typically via the user interface, such as a toolbar or drop down menu of the word processing program.

Automatic Text Conversion and Flexible Conversion Correction

Typically, Japanese text is entered into a word processing program by using a kana (Hiragana) keyboard mode, or a Romaji keyboard mode with unprompted interpretation of the Latin characters to kana. An exemplary embodiment of the present invention provides unprompted conversion of phonetically-coded characters, such as kana, to Japanese language text (Kanji, kana, and Latin) by a contextual analysis of the user's input. For this exemplary Japanese language embodiment, an "active portion," i.e., the section of kana used as the conversion unit, is provided to an IME for analysis when the active portion's composition changes. The active portion may be defined as all kana characters, up to a maximum number of characters (for example, 50 characters), corresponding to the text immediately behind an insertion point and bounded at the other end at a word break. The active portion typically consists of original input kana that is maintained in a memory storage device, reverse-converted from Japanese text to kana, or a combination of the two. The amount of the active portion that is converted to Japanese text at any one pass is determined by the probability of conversion accuracy. Each pass may result in complete, incomplete, or no conversion of the active portion. The IME typically functions such that text furthest from the insertion point is converted first, and all text that "falls out" of the active portion is converted into Japanese form. Selected portions of text to the left and the right of the active portion, if available, also can be passed to the IME to provide context for the analysis of the active portion. The text outside the active portion is presumed to be correct.

When the user moves the insertion point, typically represented by an input indicator such as a cursor, the kana of the active portion is converted to the most probable Japanese characters. If there is text to the right of the cursor, a selected portion of the text is passed to the IME along with the kana string and a selected portion of text to the left of the active portion. The text to the right of the cursor and to the left of the active portion provides the IME with context clues; text outside of the active portion is presumed to be correct, and is not affected by a cursor relocation-triggered conversion. Advantageously, the active portion text is refreshed with each pass of a selected text portion to the IME. However, the user does not detect a refresh of text on the display device unless the IME returns a different most-likely character set.

Figure 2:
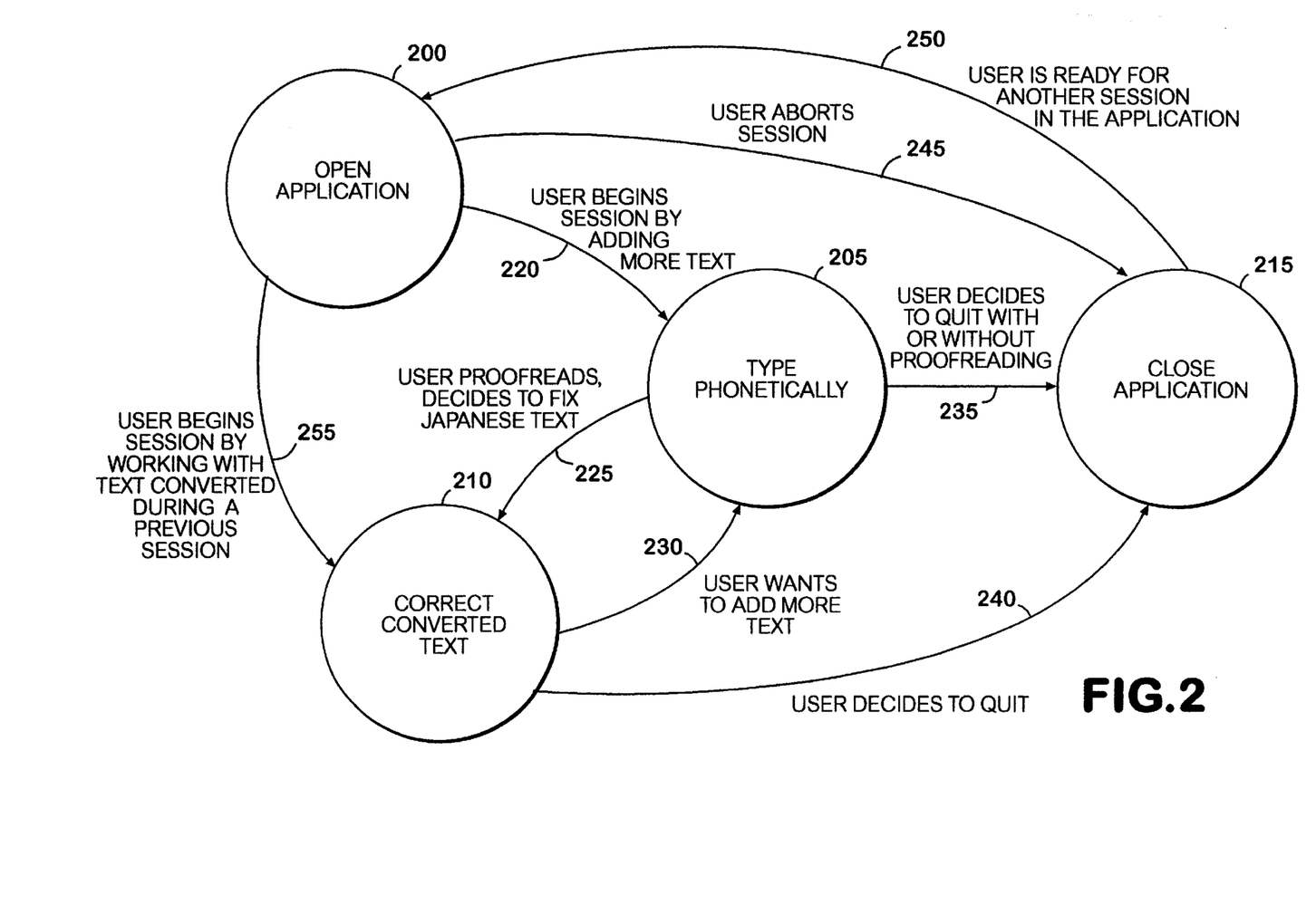
FIG. 2 is a state diagram illustrating states for creating and editing documents using a word processing program in accordance with an exemplary embodiment of the present invention.

FIG. 2 illustrates an exemplary embodiment of the present invention operating as an IME within the environment of a typical computer application, namely a word processing program for creating and editing electronic documents. An example of a typical user session for the exemplary embodiment is described below in connection with FIG. 2. The user begins her work session at state 200 by opening the application program to accept a new electronic document. If the user chooses to add text in task 220, operation transitions from state 200 to state 205 so she can begin to input phonetic characters in state 205. Text conversion is performed in the background of computing tasks by the exemplary IME, such as the front-end processor 37a (FIG. 1), as described below in reference to FIG. 3.

At a convenient point, the user can decide to proofread the conversions in task 225. For example, if she notices an incorrect conversion in task 225, operation transitions from state 205 to state 210, and she can correct the conversion in state 210. Conversion correction is described below in reference to FIG. 4 and FIG. 5. If the user chooses to complete a final proofread in task 225, then conversion errors are corrected in state 210. The user can decide to add more text in task 230, and operation returns to state 205 from state 210. From state 210, she can decide that the document is finished in task 240, thereby closing the application program in state 215.

In another session, the user can open the application program in state 200 and begin a new document by inputting phonetic characters in task 220, thereby transitioning from state 200 to state 205. Alternatively, the user can begin the session by working with text converted during a prior session in task 255, thereby transitioning from state 200 to state 210. In state 205, she can decide to quit without proofreading in task 235, thereby transitioning from state 205 to state 215 and closing the application. From state 215, she can decide to return to the document in task 250, thereby opening the application in state 200. Operating in state 200, she can begin to proofread the converted text in task 255, thereby transitioning to state 210 correct the text. The user also can decide to abort the session in task 245, thereby exiting the state 200 and closing the application in state 215.

Unprompted Conversion

Although the current state of the Japanese IME art converts kana correctly most of the time, prior IMEs typically request approval from the user in response to a conversion. Because the IME is usually accurate, the prior art method of requesting approval at each conversion is less efficient than the present invention, which allows the user to select incorrect phrases at any time. For example, in a word processing application, the user might wish to correct some noticeable errors during the document entry phase of her work, while correcting others during a final proofread.

Figure 3:
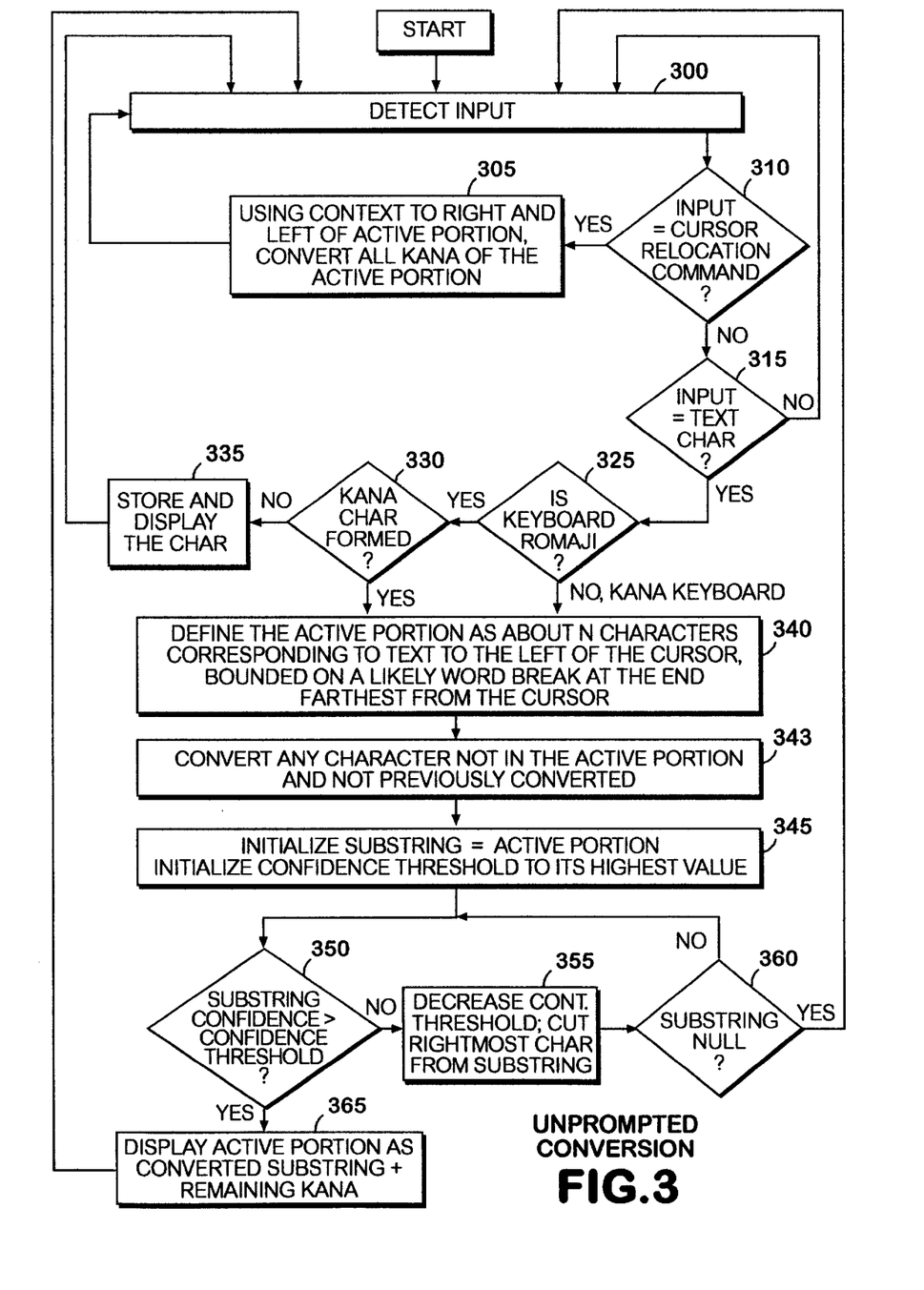
FIG. 3 is a flow diagram illustrating the steps for a method of background conversion of phonetic input to Japanese text in accordance with an exemplary embodiment of the present invention.

FIG. 3 illustrates an exemplary method for achieving the unprompted conversion of Japanese text. Upon initiating operation at the "Start" step, input is detected in step 300. At decision step 310, a determination is made whether the input is equal to a cursor relocation command, typically implemented in response to depressing the up-arrow key. If, at decision step 310, it is determined that the input is equal to a cursor relocation command, then the method proceeds to step 305. If the input is not the cursor relocation command, then the method proceeds to decision step 315.

At step 305, the active portion of the input is converted from phonetically-coded characters to Japanese text. The active portion is defined as a block of kana characters corresponding to the text displayed to the immediate left of the insertion point, i.e., the cursor. The number of characters in the active portion may vary and, for the exemplary embodiment, the character number is set to 50 characters. The conversion at step 305 differs from the conversion of step 365, discussed below, because the entire active portion is converted. Context to the right and left of the active portion is passed to the IME to improve accuracy of the conversion operation. Upon completion of the conversion operation in step 305, a loop is followed to step 300.

At decision step 315, a determination is made whether the input is a text character. If it is not a text character, the method returns to step 300. If it is determined at step 315 that the input is a text character, the method proceeds to decision step 325. At decision step 325, a determination is made whether the keyboard is in Romaji mode or kana mode. If the keyboard mode is not set to the Romaji mode, the method proceeds to the step 340.

If, however, the keyboard mode is set to the Romaji mode, the method enters decision step 330. In step 330, an inquiry is conducted to determine whether the input character completes a string of Romaji that specifies a kana character. If a kana character is specified, the Romaji character string is converted to the kana character and the method proceeds to step 340. If, in step 330, a kana character has not been specified, the method proceeds to step 335. In step 335, the Romaji input character is stored and next referenced when the method again enters step 330 from step 325. From step 335, the method returns to step 300.

The method enters step 340 when it has been determined that the user has specified a kana character, either because the keyboard was in a kana mode or the keyboard was in Romaji mode and the proper keystroke sequence for a kana character was specified. Those skilled in the art will recognize that another embodiment of the invention could enter step 340 after a kana character was specified by use of a voice recognition system to convert audible syllables to kana characters. Another embodiment of the invention could enter step 340 after receiving and storing one or more kana characters In step 340, the active portion is defined as a block of kana characters corresponding to the text string immediately behind the cursor. In a representative embodiment, the number of characters comprising the active portion is the lesser of approximately 50 characters bounded by a word break at the far end of the cursor (where possible), and the total number of characters in the kana block corresponding to all text behind or to the left of the cursor. In step 340, if some of the original kana characters are not resident in a memory storage device, they can be approximated by reverse-conversion of Japanese text. This reverse-conversion operation is completed by converting the Japanese text to the corresponding phonetic characters in a manner well known in the art.

After defining the active portion, the method proceeds from step 340 to step 343. Any text that "fell out" of the active portion in unconverted form is converted to the most probable conversion. More specifically, any character not in the active portion and not previously converted is now converted in step 343.

In step 345, a string variable can be used to hold substrings of the active portion while an inquiry is conducted to determine how much of the active portion should be converted and how much should remain displayed in kana form. In step 345, the substring is initialized to the entire active portion and another variable, a predetermined confidence threshold, is initialized.

Background conversion in accordance with this exemplary embodiment is based on three principles. First, kana should be converted as soon as enough context exists for a reliable conversion. Second, the conversion should not be "patchy," i.e., unconverted text should only exist immediately behind the cursor in a single continuous block. Third, the reliability demanded of a possible conversion decreases as the distance from the cursor increases. Kana nearest the cursor is, in typical use, more likely to accumulate additional context than kana to the opposite end of the active portion.

In decision step 350, an inquiry is conducted to determine whether the probability of accurate conversion of the entire substring exceeds the confidence threshold. If a determination is made that the probability of accurate conversion of the substring does not exceed the confidence threshold, the method proceeds to step 355. In step 355, a character or characters at the end of the substring, nearest the cursor end of the active portion, is removed from the substring. Removing one or more kana characters from the substring ensures that it will be displayed in unconverted form at the end of the automatic conversion method.

In step 355, the confidence threshold is also decreased, typically by a predetermined amount. For a new character to be part of the conversion substring, the confidence in that conversion must be high. For example, a newly-entered character might have a high conversion confidence if it forms the end of a distinctive phrase, or the end of a word without homophones.

In decision step 360, a determination is made whether the substring is empty. If the substring contains no characters, the active portion is not converted, and the method returns to input detection operation in step 300. If, however, the substring contains one or more kana characters, the method loops back to step 350. As described above, the method exits the loop consisting of steps 350, 355 and 360 when either the probability of accurate conversion meets the confidence threshold, or when all possible substrings have failed to meet the confidence threshold.

If a determination is made at step 350 that the probability of accurate conversion of the substring is greater than the confidence threshold, the method proceeds to step 365. In step 365, the characters of the active portion that correspond to the substring are converted, leaving any remainder of the active portion in kana mode. The method then returns to input detect mode by looping from step 365 to step 300.

Flexible Conversion Correction

Figure 4:
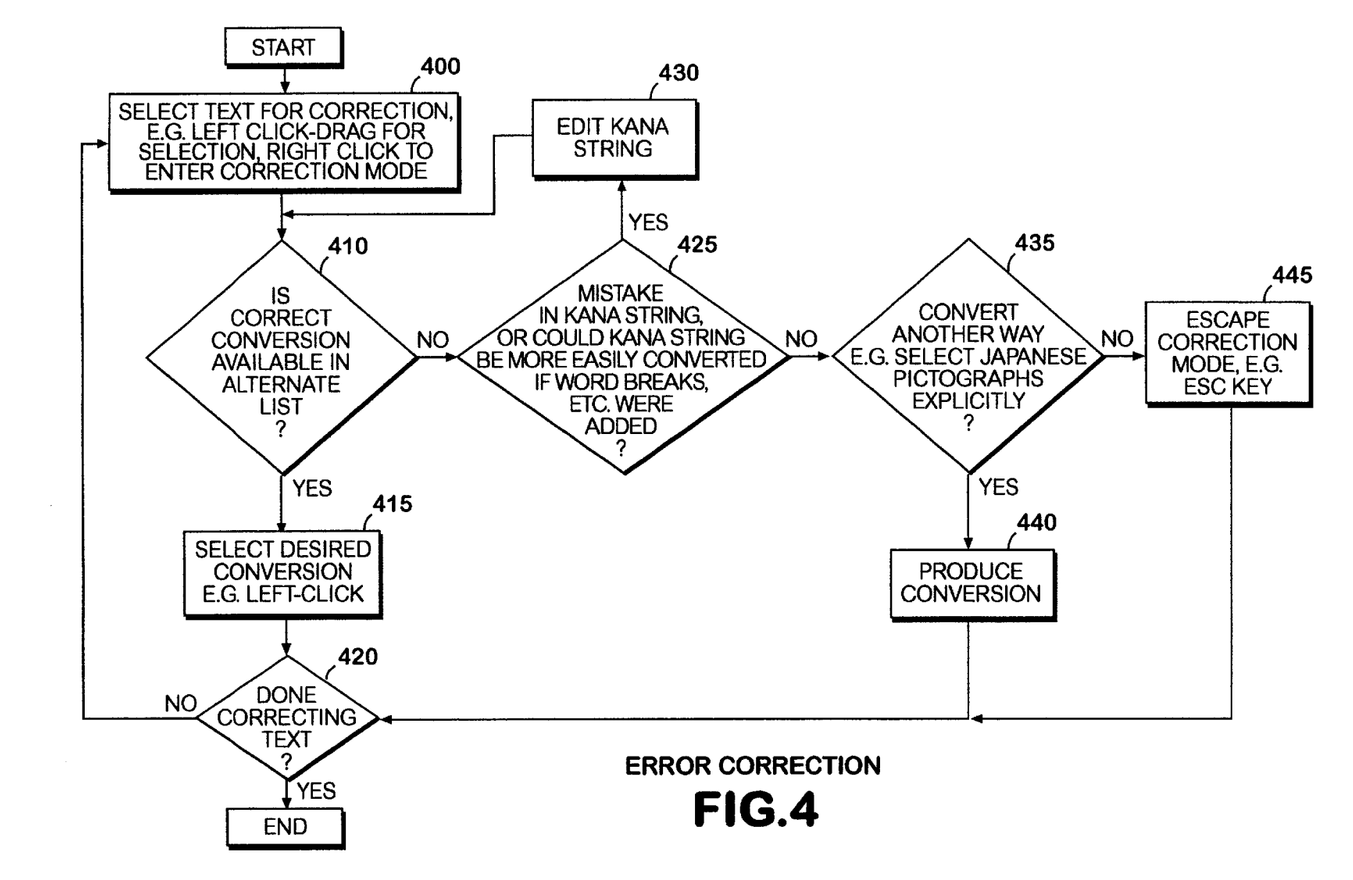
FIG. 4 is a flow diagram illustrating the steps for correcting converted text in accordance with an exemplary embodiment of the present invention.

FIG. 4 illustrates the steps for an exemplary method for correcting conversion errors resulting from conversion of phonetically-coded characters into Japanese text. Upon entering at the "Start" step, the incorrect text can be selected and a conversion error correction command executed in step 400. The conversion error correction command can be implemented as a command signal generated by an input device, such as a mouse right-click. Upon executing the conversion error correction command, a pop-up menu is typically generated, containing a list of alternate text conversions and the phonetic characters, namely the kana string, used to generate those conversions. The alternate conversions are preferably listed in probability order, from the most likely alternate conversion to the least likely conversion.

In decision step 410, the user can scan the list of alternate conversions for a desirable conversion. If the user sees an acceptable conversion, the user can select the acceptable conversion in step 415 with a selection command, e.g., a mouse left-click. In block 420, the user can determine whether the correction of conversion errors is completed. If correction of another conversion error is desired, a "No" branch is followed from step 420 to step 400 and a new block of incorrect text is selected. Otherwise, the method terminates at the "End" step in response to completion of the conversion task.

If the user observes in step 410 that the desired conversion is not in the alternate conversion list, the user can decide in step 425 whether editing the phonetic string would likely produce the desired conversion. For example, the user may provide word break information. If the user determines that she would like to edit the phonetic string, the user can move the cursor in step 430 to the kana string in the pop-up menu. This allows the user to edit the string using typical typing and editing keystrokes. This editing triggers reevaluation of the phonetic string by the IME. As a result, the alternate conversion list is updated. This updated alternate conversion list can be scanned by the user in step 410 for the desired conversion.

In decision step 425, the user may choose not to edit the phonetic string. Kanji rarely used might not be converted properly by the IME even with additional information, such as word break positions. Therefor, the user may choose to go directly to an alternate means of producing the text. In decision step 435, the user can determine whether to convert the text by another method, e.g., accessing a dictionary, or using a handwriting recognition program to draw the character using an input device, such as a mouse or a pen. If the user so chooses, the "Yes" branch is followed from step 435 and the conversion is completed in step 440.

Otherwise, if the user wishes to abandon the conversion correction for any reason, she can execute a command to leave the conversion correction process in step 445. The escape key is commonly assigned to this exit command. In response to exiting the conversion correction task in step 445, the pop-up menu is removed from the display screen, the user's original keyboard mode is resumed, and the selected text is unchanged.

In response to producing the correct conversion in step 440 or escaping the correction mode in step 445, the user in step 420 determines whether additional text requires error correction. If so, the "No" branch is followed from step 420 to step 400, and additional text is selected for correction. Otherwise, the method terminates at the "End" step.

Figure 5:
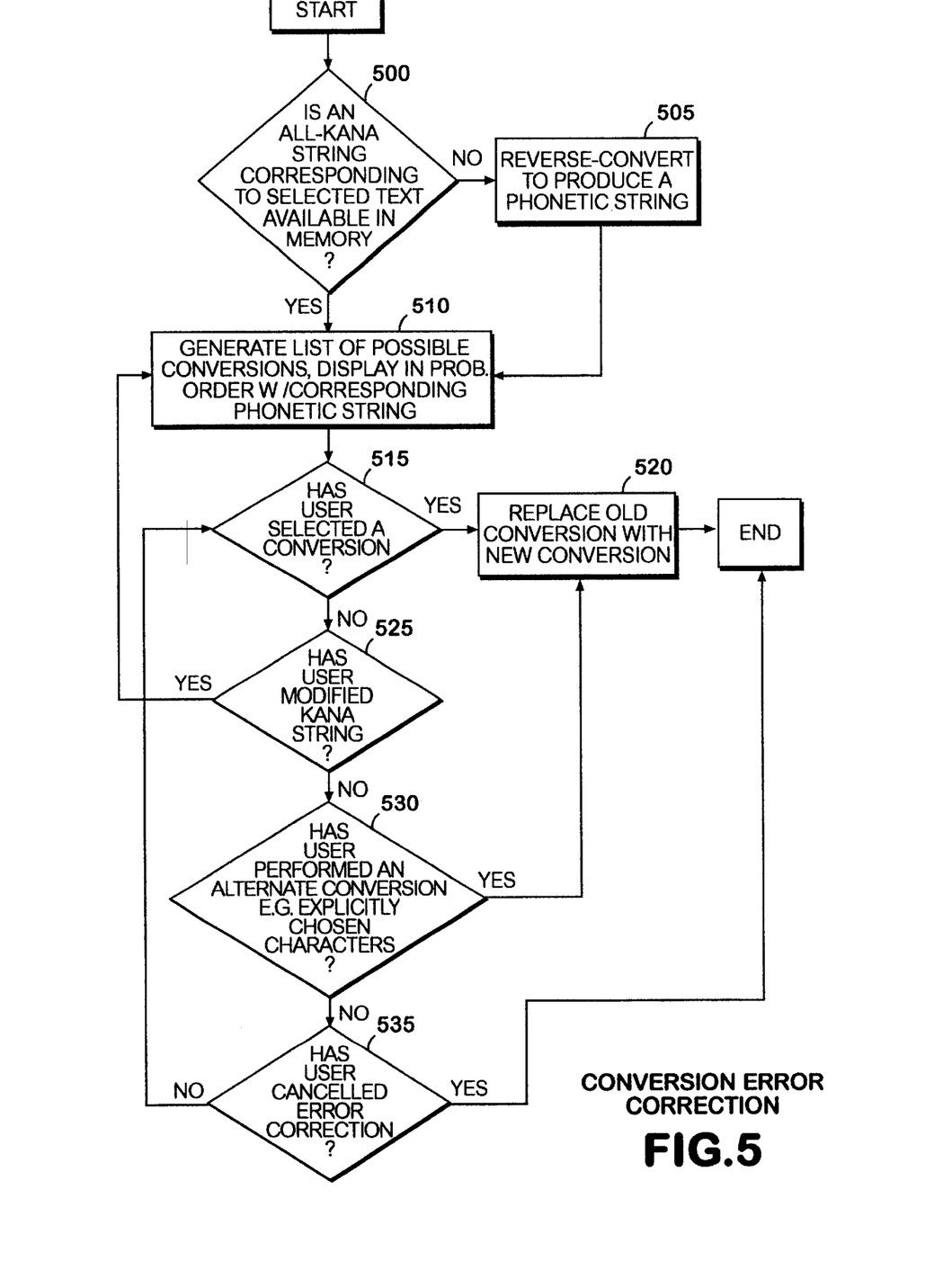
FIG. 5 is a flow diagram illustrating the steps for a method of correcting conversion errors in a Japanese text document in accordance with an exemplary embodiment of the present invention.

FIG. 5 illustrates another exemplary embodiment of the method for correcting conversion errors resulting from conversion of phonetically-coded characters into Japanese text. In the "Start" step, a block of text has been selected by the user and the conversion correction command has been given, as in step 400 of FIG. 4.

A selectable list of alternate conversions is, from a user's perspective, an efficient way of correcting conversion errors. To generate a list of alternate conversions, the IME needs access to a kana input string for the selected Japanese text. For example, the kana input string can be stored in a memory storage device. In other situations, a user can edit text that was brought into an application in finished form.

In decision step 500, it is determined whether an all-kana string corresponding to the selected text is available on a memory storage device. If an all-kana string for the selected text is not available, the method proceeds to step 505 to produce a kana string by a known reverse-conversion technique. The method proceeds to step 510 once the kana string has either been located on a memory storage device or produced through reverse-conversion. In step 510, the kana string is passed to the IME to produce a prioritized list of possible conversions. As described above in reference to FIG. 4, the user may select a possible conversion from the alternate conversions list; edit the kana string to provide more or different information to the IME; perform the conversion manually; or cancel the conversion correction process.

In decision step 515, it is determined whether the user has selected from the list of possible conversions, for example, by clicking the left mouse button. If the user has selected an alternate conversion, the incorrect text is replaced with the selected conversion in step 520. The pop-up menu is removed and the text is deselected.

However, if it is determined in step 515 that the user has not selected an alternate conversion, decision step 525 is entered. In step 525, an inquiry is conducted to determine whether the user has modified the kana string. Such modification might include changing the kana characters or inserting special symbols that indicate word breaks. If the user has modified the kana string, the method returns to step 510. In step 510, the list of alternate conversions is updated. The method then re-enters step 515, described above, at which point the user again faces four choices: selecting an alternate conversion; editing the kana string; performing a manual conversion; or canceling conversion correction.

If, in step 525, it is determined that the user has not edited the kana string, the method proceeds to decision step 530. In decision step 530, a determination is made whether the user has manually converted the kana string. For example, the user can select a dictionary function from a pull-down menu or via an icon. From the dictionary function, the user can select individual characters. If the user selects a portion of converted text, executes the command to correct a conversion error, and then accesses a dictionary and chooses characters, the method proceeds from decision step 530 to step 520. In step 520, the incorrect conversion is replaced with the manual conversion and the correction is complete. The pop-up menu is removed and the text is deselected.

If the user has neither selected an alternate conversion, modified the phonetic string, nor performed an alternate conversion, an inquiry is conducted in decision step 535 to determine whether the user has issued a cancel command. If the user elects to cancel the error correction operation, the pop-up menu is removed from the user display and the text remains selected and unchanged.

Finally, if it is determined in decision step 535 that the user has not cancelled the error correction, the method returns to step 515.

While describing steps 515 through 535 as a loop is illustrative for comparison to the user's perspective of conversion correction described in FIG. 4, it should be apparent to those skilled in the art that an alternative implementation would be for the computer-implemented method to wait on a signal from the operating system after step 510. This signal would indicate that the user has chosen among the four user options in the described embodiment, and which option has been chosen.

In summary, the present invention is directed toward a method for converting Asian language strings into strings of proper text for that language. Although the present invention has been described in connection with producing finished Japanese text from phonetic input, the invention is equally applicable to other East Asian or nonphonetic language systems. Alternative embodiments will become apparent to those skilled in the art to which the present invention pertains without departing from its spirit and scope. Accordingly, the scope of the present invention is described by the appended claims and is supported by the foregoing description.

What is claimed is:

1. A computer-implemented method for converting a phonetically-coded string into a text string comprising phonetic and nonphonetic characters for use by a program module running on a computer system, comprising the steps of:
   (a) receiving phonetic character(s);
   (b) generating a modified phonetically-coded string by adding the phonetic character(s) to the phonetically-coded string;
   (c) converting a portion of the modified phonetically-coded string to the text string in response to the portion exceeding a threshold probability of accurate conversion; and
   (d) providing the text string as an input to the program module.

2. The method of claim 1, wherein the program module comprises an Input Method Editor (IME), and steps (a)–(d) are completed as a background task by the IME.

3. The method of claim 1, wherein the portion comprises a longest continuous substring of the modified phonetically-coded string that exceeds the threshold probability of accurate conversion, wherein the threshold probability decreases as the size of the continuous substring decreases.

4. The method of claim 1 further comprising the step of correcting the text string by:
   in response to an indication of selection of a section of the text string, identifying a phonetically-coded string corresponding to the text string section;
   converting the identified phonetically-coded string to at least one corrected text string; and
   displaying each corrected text string.

5. The method of claim 4, wherein the step of identifying a phonetically-coded string corresponding to the text string section comprises accessing the phonetically-coded string maintained in a memory storage device operatively coupled to the computer system.

6. The method of claim 4 wherein the step of identifying a phonetically-coded string corresponding to the text string section comprises converting the text string section to generate the corresponding phonetically-coded string.

7. The method of claim 4, wherein the step of identifying a phonetically-coded string corresponding to the text string section comprises completing a reverse-conversion by converting the text string section to generate the corresponding phonetically-coded string in the event that the corresponding phonetically-coded string is not resident in a memory storage device operatively coupled to the computer system.

8. The method of claim 1, wherein the portion of the modified phonetically-coded string includes the starting character of the phonetically-coded string.

9. A computer-implemented method for converting a string representing syllables of an Asian language into the written characters of the Asian language for use by a program module running on a computer system, comprising the step of:

(a) inputting a string of symbols representing the syllables;

(b) responsive to inputting the symbols, converting the symbol string into a language text string without manual intervention; and (c) correcting a portion of the language text string corresponding to at least one symbol erroneously converted in step (b), by performing the steps of:
 selecting the portion of the language text string;
 identifying each symbol corresponding to the selected portion of the language text string;
 generating a plurality of alternative conversions of each erroneously converted symbol;
 displaying the plurality of alternative conversions; and
 selecting one of the plurality of alternative conversions.

10. The method of claim 9, wherein each erroneously converted symbol is generated by a reverse-conversion of the selected portion of the language text string if the symbol is not resident on a memory storage device operatively coupled to the computer system.

11. The method of claim 9, wherein each step of displaying the plurality of alternative conversions further comprises displaying the erroneously converted symbol and the alternative conversions.

12. The method of claim 9, wherein the step of displaying the alternative conversions comprises displaying the alternative conversions in a list ordered by decreasing confidence of accurate conversion.

13. A computer-implemented method for converting a phonetically-coded string into a processed text string for use by a program module for processing an electronic document on a computer system, comprising the steps of:

detecting phonetic characters of the phonetically-coded string;

constructing an active portion comprising selected ones of the phonetic characters located behind an insertion point positioned in the phonetically-coded string;

identifying a substring of the active portion, the active portion substring comprising one of the selected phonetic characters positioned furthest from the insertion point, the active portion substring exceeding a threshold probability of accurate conversion;

converting the active portion substring to a converted substring comprising processed text characters; and creating the processed text string by appending the converted substring to non-converted characters of the active portion.

14. The method of claim 13, wherein the selected phonetic characters of the active portion string are generated by reverse-conversion of corresponding text if the selected phonetic characters are not resident on a memory storage device operatively coupled to the computer system.

15. The method of claim 13, further comprising the steps of, in response to an insertion point relocation command for moving the insertion point from a prior position within the active portion to a new position within the active portion, constructing an active portion comprising selected ones of the phonetic characters located behind the prior position of the insertion point;

converting the active portion to the converted string of processed text characters; and providing the converted string of processed text characters as an input to the program module.

16. The method of claim 15, wherein converting the active portion substring to the converted string of processed text characters comprises:

identifying a conversion context defined by at least one of the phonetic characters positioned in front of and behind the active portion;

converting the active portion substring to the converted string of processed text characters based on the conversion context.

17. The method of claim 13, wherein the converting step comprises converting at least one of the selected phonetic characters just prior to excluding the one selected phonetic character from the active portion.

18. The method of claim 13, further comprising the step of correcting an error in the processed text string by performing the steps of:

selecting a portion of the processed text string corresponding to the error;

responsive to receiving a reconvert command, identifying a phonetically-coded portion corresponding to the portion of the processed text string;

generating alternate conversions by converting the phonetically-coded portion;

displaying the alternative conversions; and in response to selection of one of the alternative conversion, replacing the portion of the processed text string with the selected conversion.

19. The method of claim 18, wherein the step of identifying a phonetically-coded portion corresponding to the selected portion of the processed text string comprises applying a reverse-conversion operation of the phonetically-coded portion string if the phonetically-coded portion is not available on a memory storage device coupled to the computer system.

20. The method of claim 18 wherein the step of displaying the alternative conversions comprises displaying the phonetically-coded portion and the alternative conversions.

21. The method of claim 18 further comprising the step of correcting the error in the processed text string in response to a user specification of correct characters for the conversion.

22. The method of claim 21 wherein the user specification of correct characters comprises a selection of the correct characters from a dictionary program module.

23. The method of claim 21 wherein the user specifies the correct characters comprises inputting the correct characters with a handwriting recognition program module.

24. A computer-readable medium having computer-executable instructions for performing steps comprising:

receiving a phonetically-coded input string representing text for an Asian language;

detecting a non-converted portion of the phonetically-coded input string;

responsive to detecting the non-converted portion of the phonetically-coded input string, converting the detected non-converted portion to a string comprising characters of the Asian language without manual intervention in the event that the detected non-converted portion exceeds a threshold probability of conversion accuracy;

generating a converted text string by replacing the detected non-converted portion with the string comprising Asian language characters; and displaying the converted text string.

25. The computer-readable medium of 24, having further computer-executable instructions for performing the steps of:

recognizing a reconvert command in response to selection of at least one of the Asian language characters in the converted text string;

identifying a phonetic string corresponding to the selected characters;

generating alternative conversions for the phonetic string corresponding to the selected characters;

displaying the alternative conversions;

recognizing a selection of one of the alternative conversions; and replacing the selected characters with the selected alternative conversion.

26. The computer-readable medium of 25, having further computer-executable instructions for the steps of:

recognizing an edit of the phonetic string;

generating an alternative conversion list for the edited phonetic string; and replacing the alternative conversion list for the phonetic string with the alternative conversion list for the edited phonetic string.

27. The computer-readable medium of 25, having further computer-executable instructions for displaying the alternative conversion list in order of decreasing probability.

28. A computer-implemented method for converting a phonetically-coded string into a text string for use by a program module running on a computer system, comprising:

(a) generating a phonetically-coded string comprised of received phonetic characters;

(b) determining a probability of accurate conversion;

(c) if the probability of accurate conversion exceeds a threshold value, converting the string to a text string;

(d) if the probability of accurate conversion does not exceed the threshold value, removing the most recently entered character of the phonetically-coded string; and (e) comparing the remaining substring to a lowered threshold value, where if the lowered threshold value is exceeded, the remaining substring is converted to a text string.

29. The method of claim 28, wherein if the lowered threshold value is not exceeded, removing the most recently entered character of the phonetically-coded string and repeating (b)–(e).

30. The method of claim 29, wherein if all characters of the remaining substring have been removed, receiving additional phonetic character(s).

* * * * *